(12) United States Patent
Itoh et al.

(10) Patent No.: US 10,865,889 B2
(45) Date of Patent: Dec. 15, 2020

(54) POPPET SWITCH VALVE DEVICE AND METHOD FOR MANUFACTURING POPPET SWITCH VALVE DEVICE

(71) Applicant: CKD CORPORATION, Komaki (JP)

(72) Inventors: Shinji Itoh, Komaki (JP); Kiyonobu Hayashi, Komaki (JP); Mitsuhiro Kosugi, Komaki (JP)

(73) Assignee: CKD CORPORATION, Komaki (JP)

( * ) Notice: Subject to any disclaimer, the term of this patent is extended or adjusted under 35 U.S.C. 154(b) by 14 days.

(21) Appl. No.: 16/284,490

(22) Filed: Feb. 25, 2019

(65) Prior Publication Data

US 2019/0264823 A1   Aug. 29, 2019

(30) Foreign Application Priority Data

Feb. 28, 2018 (JP) .................. 2018-034396

(51) Int. Cl.
| | | |
|---|---|---|
| *F16K 11/07* | (2006.01) | |
| *F15B 13/04* | (2006.01) | |
| *F16K 31/06* | (2006.01) | |

(52) U.S. Cl.
CPC ...... *F16K 11/0712* (2013.01); *F15B 13/0405* (2013.01); *F16K 31/0613* (2013.01); *Y10T 137/86549* (2015.04)

(58) Field of Classification Search
CPC ............. F16K 11/0712; F16K 31/0613; F15B 13/0405; Y10T 137/86549
See application file for complete search history.

(56) References Cited

U.S. PATENT DOCUMENTS

| 7,971,599 B2 * | 7/2011 | Aoyama ................... F16K 7/14 137/270 |
| 8,371,334 B2 * | 2/2013 | Ozawa ................ F16K 11/0856 137/246 |
| 2004/0168729 A1 * | 9/2004 | Hodges ................. F15B 20/001 137/596.16 |
| 2016/0098045 A1 * | 4/2016 | Ito ......................... F15B 13/027 137/488 |

FOREIGN PATENT DOCUMENTS

JP        54-38730 B2    11/1979

\* cited by examiner

*Primary Examiner* — Kevin R Barss
(74) *Attorney, Agent, or Firm* — Brandon V. Zuniga; James R. Gourley; Carstens & Cahoon, LLP

(57) ABSTRACT

A poppet switch valve device includes a valve body, a first valve rod including a first valve member, a second valve rod including a second valve member, and a solenoid. When a jig engages with an engagement portion of the first valve rod and rotates the first valve rod so that an internally-threaded hole formed in the first valve rod engages with and moves forward and backward relative to an external thread formed on an outer circumferential surface of the second valve rod, the first valve rod is moved relative to the second valve rod in the axial direction. The poppet switch valve device further includes a restriction portion configured to restrict movement of the first valve rod relative to the second valve rod in the axial direction after the first valve rod is moved relative to the second valve rod in the axial direction using the jig.

4 Claims, 11 Drawing Sheets

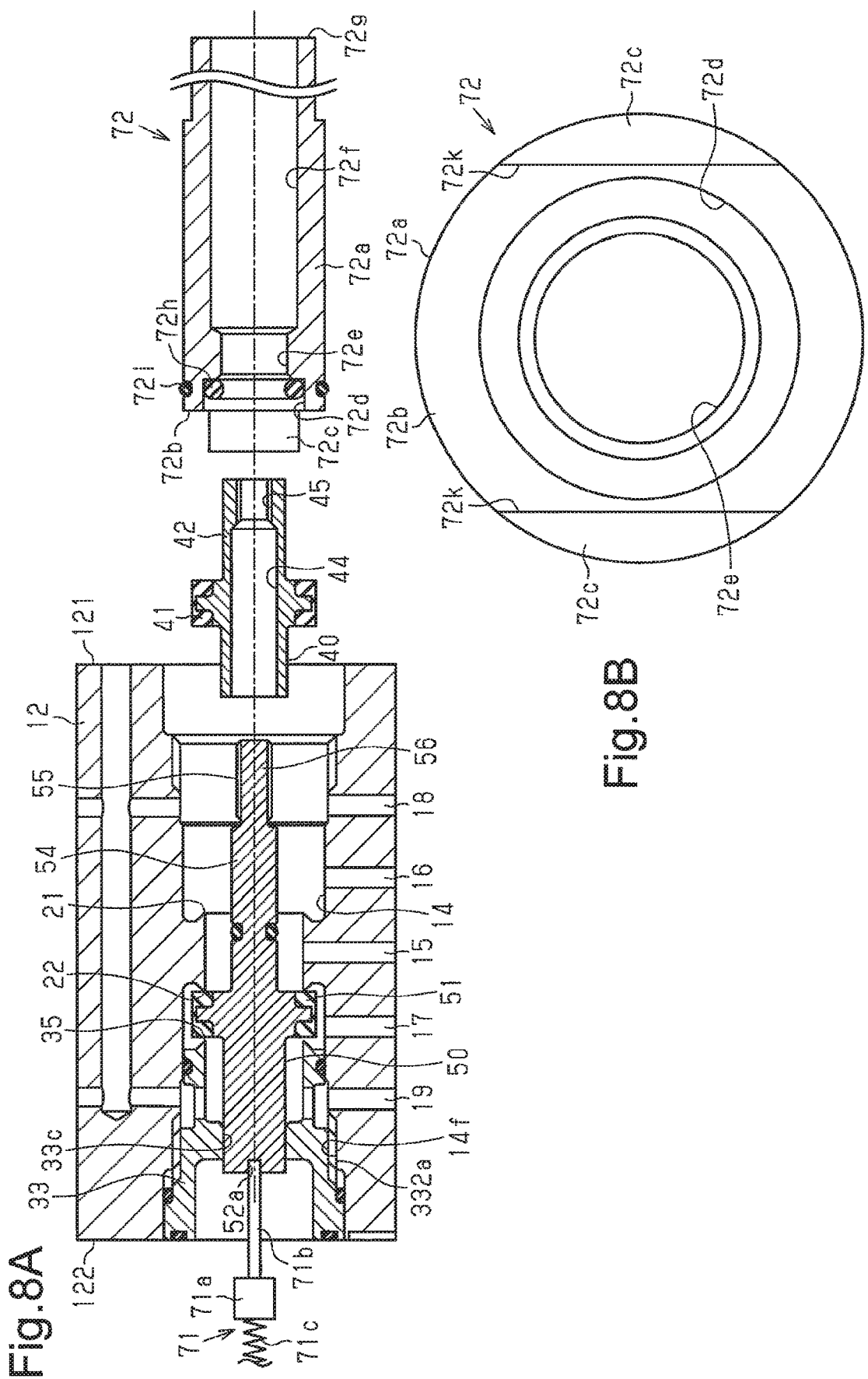

Prior Art

POPPET SWITCH VALVE DEVICE AND METHOD FOR MANUFACTURING POPPET SWITCH VALVE DEVICE

BACKGROUND

1. Field

The present disclosure relates to a poppet switch valve device and a method for manufacturing a poppet switch valve device.

2. Description of Related Art

As shown in FIG. 13, Japanese Examined Patent Publication No. 54-38730 describes an example of a poppet switch valve device 100 that includes a tubular valve body 101. A through hole 102 extends through the valve body 101 in the axial direction of the valve body 101. The valve body 101 includes a supply port 103, an output port 104, and a discharge port 105 that are in communication with the through hole 102. The valve body 101 further includes a first valve seat 106 and a second valve seat 107 facing opposite sides in the axial direction of the valve body 101.

The poppet switch valve device 100 further includes a first valve rod 108 having a first valve member 108v that contacts and separates from the first valve seat 106 and a second valve rod 109 having a second valve member 109v that contacts and separates from the second valve seat 107. The first valve rod 108 and the second valve rod 109 are coaxially coupled to each other. The first valve rod 108 and the second valve rod 109 are accommodated in the through hole 102 and configured to integrally reciprocate within the through hole 102 in the axial direction of the valve body 101.

For example, when the first valve rod 108 and the second valve rod 109 move in the through hole 102 toward one side in the axial direction of the valve body 101, the first valve member 108v is seated on the first valve seat 106 and the second valve member 109v is separated from the second valve seat 107. This interrupts communication between the supply port 103 and the output port 104 via the through hole 102 and allows communication between the output port 104 and the discharge port 105 via the through hole 102. For example, when the first valve rod 108 and the second valve rod 109 move in the through hole 102 toward the other side in the axial direction of the valve body 101, the first valve member 108v is separated from the first valve seat 106 and the second valve member 109v is seated on the second valve seat 107. This allows the communication between the supply port 103 and the output port 104 via the through hole 102 and interrupts the communication between the output port 104 and the discharge port 105 via the through hole 102.

For example, the first valve seat 106 or the second valve seat 107 may have a dimensional tolerance in the axial direction of the valve body 101. Also, the first valve rod 108 or the second valve rod 109 may have a dimensional tolerance in the axial direction. The addition of such dimensional tolerances may cause an increase in tolerances of strokes of the first valve member 108v and the second valve member 109v. The increase in tolerances of strokes of the first valve member 108v and the second valve member 109v causes variations of the flow rate of a fluid. Additionally, when the poppet switch valve device 100 includes a solenoid having a coil and a plunger moved by excitation of the coil and the first valve rod 108 and the second valve rod 109 are integrally moved by the movement of the plunger, if the tolerances of strokes of the first valve member 108v and the second valve member 109v increase, power supplied to the coil to move the plunger may increase.

The first valve rod 108 includes an internally-threaded hole 108h. The second valve rod 109 includes an external thread 109a engaged with the internally-threaded hole 108h. The second valve rod 109 includes a stepped surface 109e configured to contact an end surface 108e of the first valve rod 108 opposed to the second valve rod 109. The external thread 109a is moved forward relative to the internally-threaded hole 108h until the stepped surface 109e of the second valve rod 109 comes into contact with the end surface 108e of the first valve rod 108. When the stepped surface 109e of the second valve rod 109 is in contact with the end surface 108e of the first valve rod 108, reaction forces are generated between the end surface 108e of the first valve rod 108 and the stepped surface 109e of the second valve rod 109 acting in directions separating from each other. The thread ridge of the external thread 109a and the thread ridge of the internally-threaded hole 108h are forced against each other in the axial direction of the first valve rod 108 and the second valve rod 109. This generates fastening force between the first valve rod 108 and the second valve rod 109 and couples the first valve rod 108 and the second valve rod 109 to each other.

Although the first valve rod 108 and the second valve rod 109 are thread-fastened to each other, the external thread 109a needs to move forward relative to the internally-threaded hole 108h until the stepped surface 109e of the second valve rod 109 comes into contact with the end surface 108e of the first valve rod 108. Thus, the relative position of the first valve rod 108 and the second valve rod 109 is uniquely specified in the axial direction. The strokes of the first valve member 108v and the second valve member 109v cannot be adjusted in accordance with a dimensional tolerance of the first valve seat 106 or the second valve seat 107 in the axial direction of the valve body 101 or a dimensional tolerance of the first valve rod 108 or the second valve rod 109 in the axial direction.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

It is an object of the present disclosure to provide a poppet switch valve device and a method for manufacturing a poppet switch valve device that limit variations in the flow rate of a fluid and reduce power supplied to a coil.

One aspect of the present disclosure is a poppet switch valve device that includes a tubular valve body, a first valve rod, a second valve rod, and a solenoid. A through hole extends through the valve body in an axial direction of the valve body. The valve body includes a first valve seat and a second valve seat facing opposite sides in the axial direction of the valve body. The first valve rod includes a first valve member configured to contact and separate from the first valve seat. The second valve rod includes a second valve member configured to contact and separate from the second valve seat. The solenoid includes a coil and a plunger configured to be moved by excitation of the coil. The first valve rod and the second valve rod are coaxially coupled to each other and configured to integrally move within the through hole in the axial direction of the valve body in accordance with movement of the plunger. The poppet switch valve device is configured to switch a flow passage when the first valve member contacts and separates from the first valve seat and the second valve member contacts and separates from the second valve seat. The first valve rod includes an insertion hole extending through in an axial direction of the first valve rod. The second valve rod includes an insertion portion inserted into the insertion hole. The insertion portion includes an outer circumferential surface including an external thread. The insertion hole includes an internally-threaded hole engaged with the external thread. The first valve rod includes an engagement portion configured to engage with a jig. When the jig engages with the engagement portion and rotates the first valve rod so that the internally-threaded hole moves forward and backward relative to the external thread, the first valve rod is moved relative to the second valve rod in the axial direction. The poppet switch valve device further includes a restriction portion. The restriction portion is configured to restrict movement of the first valve rod relative to the second valve rod in the axial direction after the first valve rod is moved relative to the second valve rod in the axial direction using the jig.

One aspect of the present disclosure is a method for manufacturing a poppet switch valve device. The method includes preparing a tubular valve body, through which a through hole extends in an axial direction of the valve body, the valve body including a first valve seat and a second valve seat in the through hole, and the first valve seat and the second valve seat facing opposite sides in the axial direction of the valve body; arranging a first valve rod and a second valve rod in the through hole, the first valve rod including a first valve member configured to switch a flow passage by contacting and separating from the first valve seat, and the second valve rod including a second valve member configured to switch a flow passage by contacting and separating from the second valve seat; arranging a solenoid in the through hole, the solenoid including a coil and a plunger configured to be moved by excitation of the coil; inserting an insertion portion of the second valve rod including an external thread through an insertion hole extending through the first valve rod in an axial direction of the first valve rod; coaxially coupling the first valve rod and the second valve rod to each other by engaging an internally-threaded hole of the insertion hole with the external thread; engaging a jig with an engagement portion of the first valve rod; moving the first valve rod relative to the second valve rod in the axial direction by rotating the first valve rod using the jig so that the internally-threaded hole moves forward and backward relative to the external thread; and engaging a fastening member with one of the external thread and the internally-threaded hole to restrict movement of the first valve rod relative to the second valve rod in the axial direction after the first valve rod is moved relative to the second valve rod in the axial direction using the jig.

BRIEF DESCRIPTION OF THE DRAWINGS

FIG. 8A is an exploded cross-sectional view showing a state before the first valve rod is coupled to the valve body.

FIG. 8B is a front view of a first jig.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

An embodiment of a poppet switch valve device will now be described with reference to the drawings.

Figure 1:
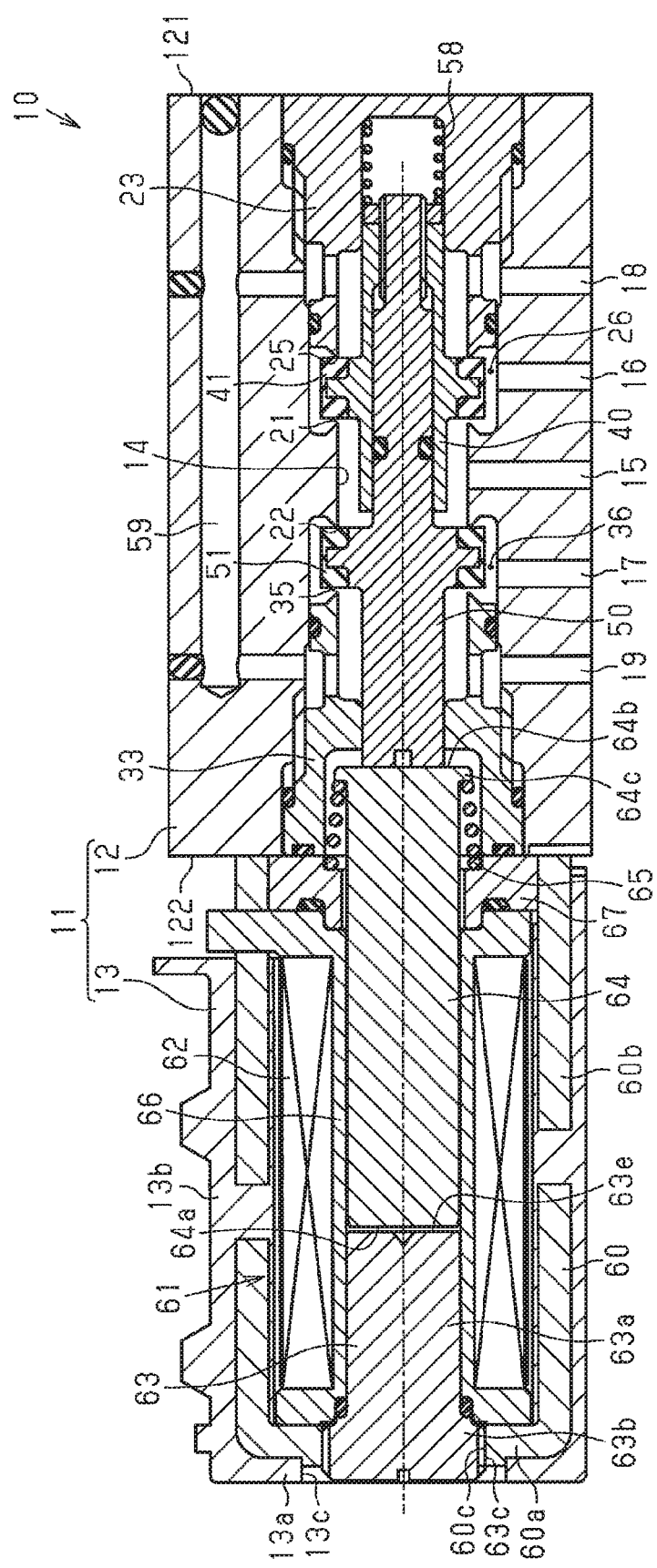
FIG. 1 is a cross-sectional view showing an embodiment of a poppet switch valve device.

As shown in FIG. 1, a poppet switch valve device 10 includes a body 11. The body 11 includes a valve body 12 having the form of an elongated tetragonal tube and a magnetic cover 13 having the form of an elongated tetragonal tube and coupled to an end of the valve body 12 in the longitudinal direction. The valve body 12 and the magnetic cover 13 are formed from, for example, a synthetic resin material. Thus, the valve body 12 and the magnetic cover 13 are formed from a non-magnetic material.

Figure 2:
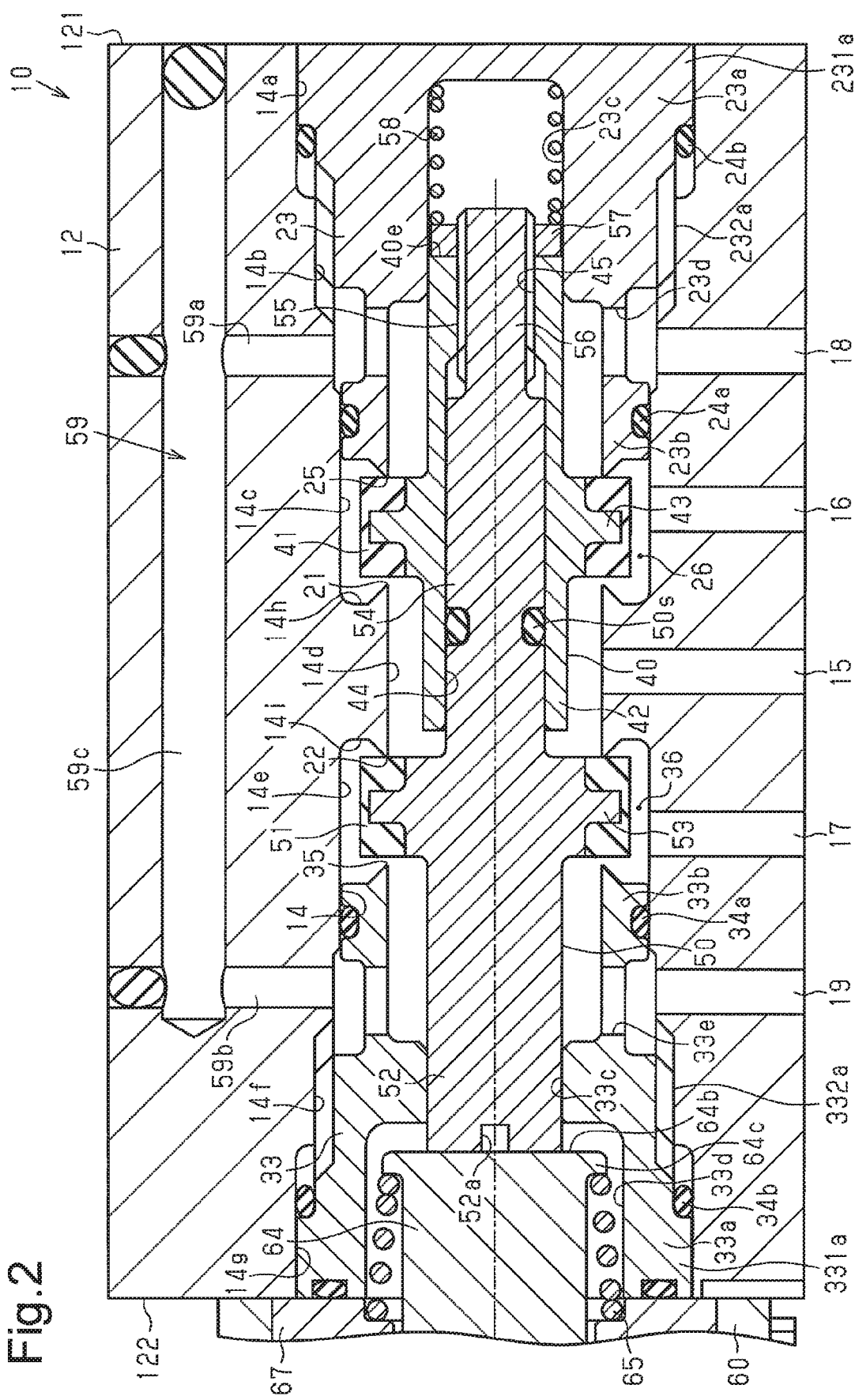
FIG. 2 is a partially enlarged cross-sectional view of the poppet switch valve device shown in FIG. 1.

As shown in FIG. 2, a circular through hole 14 extends through the valve body 12 in the axial direction of the valve body 12. The valve body 12 includes a supply port 15, a first output port 16, a second output port 17, a first discharge port 18, and a second discharge port 19. The supply port 15, the first output port 16, the second output port 17, the first discharge port 18, and the second discharge port 19 are in communication with the through hole 14. The first discharge port 18, the first output port 16, the supply port 15, the second output port 17, and the second discharge port 19 are sequentially arranged in the axial direction of the valve body 12. Each of the supply port 15, the first output port 16, the second output port 17, the first discharge port 18, and the second discharge port 19 has an end opposite to the through hole 14 and open in an outer surface of the valve body 12. The poppet switch valve device 10 of the present embodiment is a five-port switch valve.

The through hole 14 includes a first large diameter hole 14a, a first internally-threaded hole 14b, a first medium diameter hole 14c, a small diameter hole 14d, a second middle diameter hole 14e, a second internally-threaded hole 14f, and a second large diameter hole 14g. The first large diameter hole 14a, the first internally-threaded hole 14b, the first medium diameter hole 14c, the small diameter hole 14d, the second middle diameter hole 14e, the second internally-threaded hole 14f, and the second large diameter hole 14g are sequentially arranged from a first end surface 121 of the valve body 12 located at one axial end toward a second end surface 122 of the valve body 12 located at the other axial end. The first large diameter hole 14a is open in the first end surface 121 of the valve body 12. The second large diameter hole 14g is open in the second end surface 122 of the valve body 12. The first large diameter hole 14a, the first internally-threaded hole 14b, the first medium diameter hole 14c, the small diameter hole 14d, the second middle diameter hole 14e, the second internally-threaded hole 14f, and the second large diameter hole 14g are coaxial with each other.

The first large diameter hole 14a and the second large diameter hole 14g have the same diameter. The first medium diameter hole 14c and the second middle diameter hole 14e have the same diameter. The first medium diameter hole 14c and the second middle diameter hole 14e have a smaller diameter than the first large diameter hole 14a and the second large diameter hole 14g. The small diameter hole 14d has a smaller diameter than the first medium diameter hole 14c and the second middle diameter hole 14e. The valve body 12 includes an annular first stepped surface 14h connecting the small diameter hole 14d and the first medium diameter hole 14c and extending in a direction orthogonal to the axial direction of the valve body 12. The valve body 12 further includes an annular second stepped surface 14i connecting the small diameter hole 14d and the second middle diameter hole 14e and extending in a direction orthogonal to the axial direction of the valve body 12.

The valve body 12 includes an annular first supply valve seat 21 corresponding to a first valve seat and projecting from the first stepped surface 14h toward the first medium diameter hole 14c. The valve body 12 further includes an annular second supply valve seat 22 corresponding to a second valve seat and projecting from the second stepped surface 14i toward the second middle diameter hole 14e. The first supply valve seat 21 and the second supply valve seat 22 respectively project from the first stepped surface 14h and the second stepped surface 14i away from each other in the axial direction of the valve body 12 and face opposite sides in the axial direction of the valve body 12. More specifically, the first supply valve seat 21 and the second supply valve seat 22 extend in the through hole 14 from an inner circumferential surface of the valve body 12 to opposite sides in the axial direction of the valve body 12. The first supply valve seat 21 and the second supply valve seat 22 have the same inner diameter. The inner diameter of the first supply valve seat 21 and the second supply valve seat 22 is the same as the diameter of the small diameter hole 14d. The inner circumferential surfaces of the first supply valve seat 21 and the second supply valve seat 22 are coplanar with the wall surface of the small diameter hole 14d.

A tubular first plug 23 is coupled to the valve body 12. The first plug 23 includes a discoid base 23a and a tubular extension 23b extending from an outer circumferential portion of the base 23a along the wall surface of the through hole 14. The base 23a includes a closing portion 231a that closes the first large diameter hole 14a and a first externally-threaded portion 232a engaged with the first internally-threaded hole 14b. The extension 23b extends from a peripheral edge of the first externally-threaded portion 232a along the first medium diameter hole 14c. The engagement of the first externally-threaded portion 232a with the first internally-threaded hole 14b couples the first plug 23 to the through hole 14 in the valve body 12.

The inner diameter of the extension 23b is the same as the diameter of the small diameter hole 14d. The base 23a includes a circular recess 23c that is in communication with an inner side of the extension 23b. The diameter of the recess 23c is smaller than the inner diameter of the extension 23b. The extension 23b extends through the vicinity of the first discharge port 18 that is open toward the through hole 14 to the vicinity of the first output port 16 that is open toward the through hole 14. The inner side of the extension 23b is in communication with the through hole 14. The extension 23b includes a communication hole 23d in a portion opposed to the first discharge port 18.

An annular first seal member 24a is attached to an outer circumferential surface of the extension 23b. More specifically, the first seal member 24a is arranged between the outer circumferential surface of the extension 23b and a portion of the wall surface of the through hole 14 located between the first output port 16 and the first discharge port 18. The first seal member 24a limits leakage of a fluid between the first output port 16 and the first discharge port 18 through a gap between the outer circumferential surface of the extension 23b and the portion of the wall surface of the through hole 14 between the first output port 16 and the first discharge port 18.

Additionally, an annular second seal member 24b is attached to the outer circumferential surface of the base 23a. More specifically, the second seal member 24b is arranged between the outer circumferential surface of the base 23a and a portion of the wall surface of the through hole 14 located at a side of the first discharge port 18 opposite to the first output port 16. The second seal member 24b limits leakage of a fluid from the first discharge port 18 through a gap between the outer circumferential surface of the base 23a and the portion of the wall surface of the through hole 14 located at the side of the first discharge port 18 opposite to the first output port 16.

The extension 23b has a distal surface opposed to the first stepped surface 14h in the axial direction of the valve body 12. An annular first discharge valve seat 25 projects from the distal surface of the extension 23b. The first discharge valve seat 25 is arranged in the through hole 14 and opposed to the first supply valve seat 21 in the axial direction of the valve body 12. Thus, the first plug 23 is a first valve seat forming body including the first discharge valve seat 25. The first discharge valve seat 25 and the extension 23*b* have the same inner diameter. The inner circumferential surface of the first discharge valve seat 25 is coplanar with the inner circumferential surface of the extension 23*b*. Therefore, the first discharge valve seat 25 and the first supply valve seat 21 have the same inner diameter. A first valve chamber 26 is defined in the through hole 14 between the first supply valve seat 21 and the first discharge valve seat 25. Thus, the through hole 14 includes the first valve chamber 26 located between the first supply valve seat 21 and the first discharge valve seat 25.

A tubular second plug 33 is attached to the valve body 12. The second plug 33 includes a tubular main body 33*a* and a tubular extension 33*b* extending from an outer circumferential portion of the main body 33*a* along the wall surface of the through hole 14. The main body 33*a* includes a fitting portion 331*a* fitted to the first large diameter hole 14*a* and a second externally-threaded portion 332*a* engaged with the second internally-threaded hole 14*f*. The extension 33*b* extends from a peripheral edge of the second externally-threaded portion 332*a* along the second middle diameter hole 14*e*. The engagement of the second externally-threaded portion 332*a* with the second internally-threaded hole 14*f* couples the second plug 33 to the through hole 14 in the valve body 12.

The inner diameter of the extension 33*b* is the same as the diameter of the small diameter hole 14*d*. The main body 33*a* includes a circular guide hole 33*c* that is in communication with an inner side of the extension 33*b* and a large diameter hole 33*d* that is in communication with an end of the guide hole 33*c* opposite to the extension 33*b*. The large diameter hole 33*d* has a larger diameter than the guide hole 33*c*. The extension 33*b* extends through the vicinity of the second discharge port 19 that is open toward the through hole 14 to the vicinity of the second output port 17 that is open toward the through hole 14. The inner side of the extension 33*b* is in communication with the through hole 14. The extension 33*b* includes a communication hole 33*e* in a portion opposed to the second discharge port 19.

An annular first seal member 34*a* is attached to an outer circumferential surface of the extension 33*b*. More specifically, the first seal member 34*a* is arranged between the outer circumferential surface of the extension 33*b* and a portion of the wall surface of the through hole 14 located between the second output port 17 and the second discharge port 19. The first seal member 34*a* limits leakage of a fluid between the second output port 17 and the second discharge port 19 through a gap between the outer circumferential surface of the extension 33*b* and the portion of the wall surface of the through hole 14 between the second output port 17 and the second discharge port 19.

Additionally, an annular second seal member 34*b* is attached to the outer circumferential surface of the main body 33*a*. More specifically, the second seal member 34*b* is arranged between the outer circumferential surface of the main body 33*a* and a portion of the wall surface of the through hole 14 located at a side of the second discharge port 19 opposite to the second output port 17. The second seal member 34*b* limits leakage of a fluid from the second discharge port 19 through a gap between the outer circumferential surface of the main body 33*a* and the portion of the wall surface of the through hole 14 located at the side of the second discharge port 19 opposite to the second output port 17.

The extension 33*b* has a distal surface opposed to the second stepped surface 14*i* in the axial direction of the valve body 12. An annular second discharge valve seat 35 projects from the distal surface of the extension 33*b*. The second discharge valve seat 35 is arranged in the through hole 14 and opposed to the second supply valve seat 22 in the axial direction of the valve body 12. Thus, the second plug 33 is a second valve seat forming body including the second discharge valve seat 35. The second discharge valve seat 35 and the extension 33*b* have the same inner diameter. The inner circumferential surface of the second discharge valve seat 35 is coplanar with the inner circumferential surface of the extension 33*b*. Therefore, the second discharge valve seat 35 and the second supply valve seat 22 have the same inner diameter. A second valve chamber 36 is defined in the through hole 14 between the second supply valve seat 22 and the second discharge valve seat 35. Thus, the through hole 14 includes the second valve chamber 36 located between the second supply valve seat 22 and the second discharge valve seat 35.

The supply port 15 is in communication with the small diameter hole 14*d*, that is, the portion of the through hole 14 located between the first supply valve seat 21 and the second supply valve seat 22 in the axial direction of the valve body 12. The first output port 16 is in communication with the first valve chamber 26. The second output port 17 is in communication with the second valve chamber 36. The first discharge port 18 is in communication with a portion of the through hole 14 located at a side of the first valve chamber 26 opposite to the supply port 15. The second discharge port 19 is in communication with a portion of the through hole 14 located at a side of the second valve chamber 36 opposite to the supply port 15.

The poppet switch valve device 10 includes a first valve rod 40 and a second valve rod 50. The first valve rod 40 and the second valve rod 50 are formed from metal. The first valve rod 40 includes a first valve member 41. More specifically, the first valve rod 40 is coupled to the first valve member 41. The first valve member 41 is accommodated in the first valve chamber 26. The second valve rod 50 includes a second valve member 51. More specifically, the second valve rod 50 is coupled to the second valve member 51. The second valve member 51 is accommodated in the second valve chamber 36. The first valve rod 40 and the second valve rod 50 are coaxially coupled to each other and configured to integrally reciprocate within the through hole 14 in the axial direction of the valve body 12.

The first valve rod 40 includes a cylindrical shaft 42 and an annular large diameter portion 43 projecting from an outer circumferential surface of the shaft 42. The shaft 42 extends through the small diameter hole 14*d*, the first medium diameter hole 14*c*, and the inner side of the extension 23*b* and fits into the recess 23*c*. The outer diameter of the shaft 42 is slightly smaller than the diameter of the recess 23*c*. When the first valve rod 40 and the second valve rod 50 integrally move in the axial direction of the valve body 12, the wall surface of the recess 23*c* serves as a guide surface that slides on the outer circumferential surface of the shaft 42 and guides the movement of the first valve rod 40 in the axial direction of the valve body 12.

The first valve member 41 is annular and formed from rubber and is attached to the large diameter portion 43 to cover the outer circumferential surface of the large diameter portion 43. The first valve member 41 is arranged between the first supply valve seat 21 and the first discharge valve seat 25 in the axial direction of the valve body 12. The first valve member 41 is configured to contact and separate from the first supply valve seat 21 and the first discharge valve seat 25.

Figure 3A:
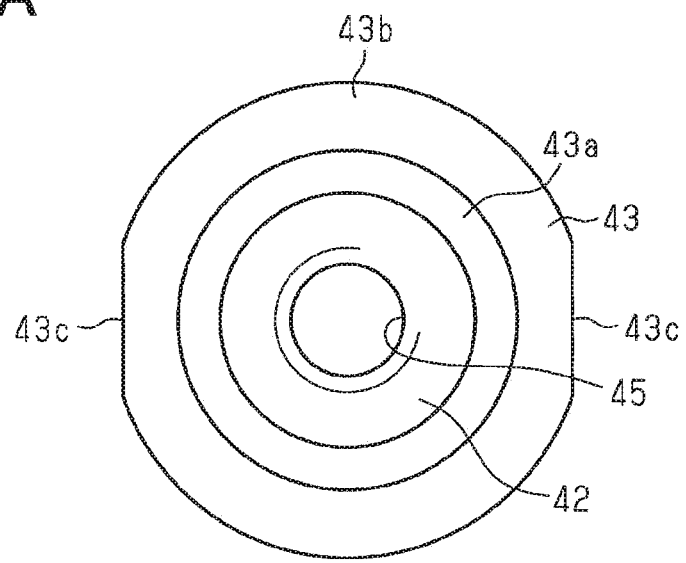
FIG. 3A is a front view of a first valve rod without attachment of a first valve member to the first valve rod.
Figure 3B:
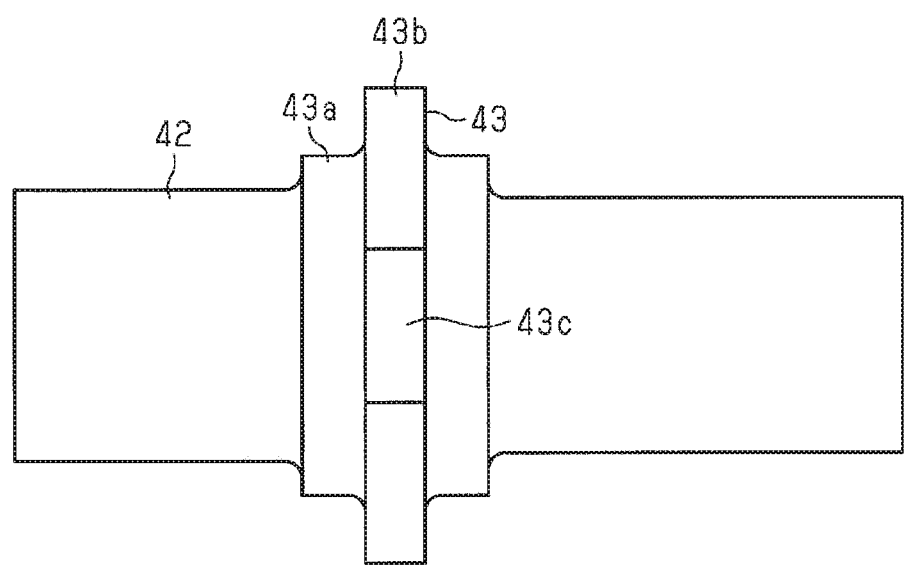
FIG. 3B is a side view of the first valve rod without attachment of the first valve member to the first valve rod.

As shown in FIGS. 3A and 3B, the large diameter portion 43 includes an annular step 43a and an annular flange 43b projecting from an outer circumferential surface of the step 43a. The flange 43b has an outer circumferential surface including two planar portions 43c that are flat and extend parallel to each other.

Figure 4A:
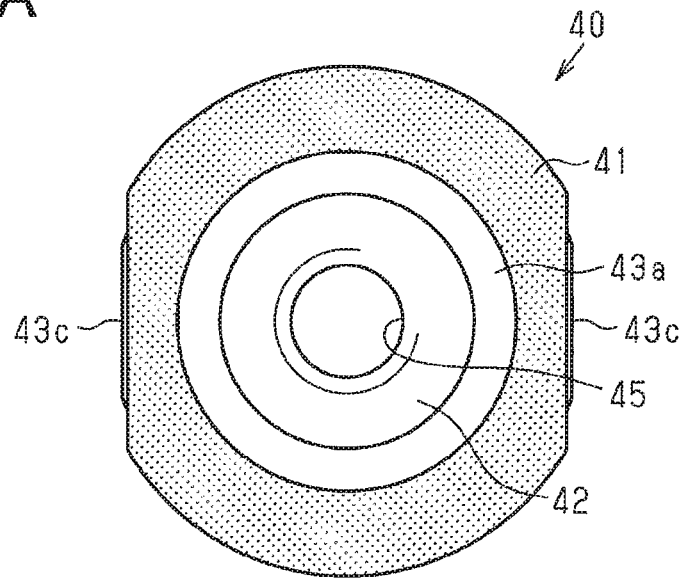
FIG. 4A is a front view of the first valve rod and the first valve member attached to the first valve rod.
Figure 4B:
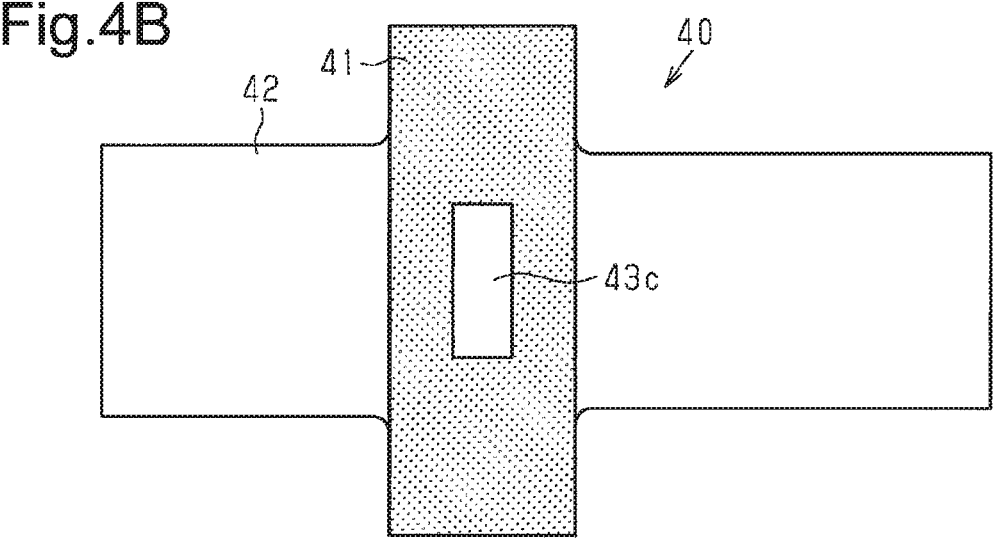
FIG. 4B is a side view of the first valve rod and the first valve member attached to the first valve rod.

As shown in FIGS. 4A and 4B, the first valve member 41 covers the outer circumferential surface of the step 43a, opposite end surfaces of the flange 43b located at opposite sides in the axial direction of the first valve rod 40, and a portion of the outer circumferential surface of the flange 43b excluding the two planar portions 43c. Thus, the two planar portions 43c, which are portions of the first valve rod 40, are exposed from the outer circumferential surface of the first valve member 41. The two planar portions 43c slightly project from the outer circumferential surface of the first valve member 41.

As shown in FIG. 2, an insertion hole 44 extends through the shaft 42 in the axial direction of the first valve rod 40. The insertion hole 44 includes an internally-threaded hole 45. The internally-threaded hole 45 is located at an end of the insertion hole 44 closer to the recess 23c of the first plug 23.

The second valve rod 50 includes a cylindrical guide portion 52, a large diameter portion 53 having a larger outer diameter than the guide portion 52, and a cylindrical shaft 54 extending from the large diameter portion 53 toward a side opposite to the guide portion 52. The second valve rod 50 extends through the large diameter hole 33d and the guide hole 33c of the second plug 33, the inner side of the extension 33b, the second middle diameter hole 14e, and the small diameter hole 14d. The shaft 54 of the second valve rod 50 is inserted through the insertion hole 44 in the first valve rod 40.

The end surface of the guide portion 52 opposite to the large diameter portion 53 includes a rotation restriction recess 52a. The rotation restriction recess 52a is, for example, a slit. The outer diameter of the guide portion 52 is slightly smaller than the diameter of the guide hole 33c. When the first valve rod 40 and the second valve rod 50 integrally move in the axial direction of the valve body 12, the wall surface of the guide hole 33c serves as a guide surface that slides on the outer circumferential surface of the guide portion 52 and guides the movement of the second valve rod 50 in the axial direction of the valve body 12. The first valve rod 40 is supported by the recess 23c, and the second valve rod 50 is supported by the guide hole 33c. This allows the first valve rod 40 and the second valve rod 50 to reciprocate in the axial direction of the valve body 12 while restricting inclinations of the first valve rod 40 and the second valve rod 50 from the axial direction.

The second valve member 51 is annular and formed from rubber and is attached to the large diameter portion 53 to cover the outer circumferential surface of the large diameter portion 53. The second valve member 51 is arranged between the second supply valve seat 22 and the second discharge valve seat 35 in the axial direction of the valve body 12. The second valve member 51 is configured to contact and separate from the second supply valve seat 22 and the second discharge valve seat 35.

The shaft 54 includes an insertion portion 56, the outer circumferential surface of which includes an external thread 55. The insertion portion 56 is an end portion of the shaft 54 opposite to the large diameter portion 53. The external thread 55 engages with the internally-threaded hole 45 in the first valve rod 40. Thus, the internally-threaded hole 45 is engaged with the external thread 55. The first valve rod 40 includes an end surface 40e opposed to the recess 23c. The insertion portion 56 has a distal portion projecting in the recess 23c beyond the end surface 40e.

A seal portion 50s is arranged between the shaft 54 and the wall surface of the insertion hole 44. The seal portion 50s is annular and formed from rubber. The seal portion 50s is attached to the outer circumferential surface of the shaft 54. The seal portion 50s limits leakage of a fluid through a gap between the outer circumferential surface of the shaft 54 and the wall surface of the insertion hole 44.

The external thread 55 of the distal portion of the insertion portion 56 engages with a nut 57, or a fastening member. The nut 57 is accommodated in the recess 23c. The nut 57 is in contact with the end surface 40e of the first valve rod 40. When the nut 57 is in contact with the end surface 40e of the first valve rod 40, reaction forces are generated between the end surface 40e of the first valve rod 40 and the nut 57 acting in directions separating from each other. The thread ridge of the external thread 55 and the thread ridge of the internally-threaded hole 45 are forced against each other in the axial direction of the first valve rod 40 and the second valve rod 50. Also, the thread ridge of the nut 57 and the thread ridge of the external thread 55 are forced against each other in the axial direction of the first valve rod 40 and the second valve rod 50. This generates fastening force between the first valve rod 40 and the second valve rod 50 via the nut 57 and couples the first valve rod 40 and the second valve rod 50 to each other.

Figure 5:
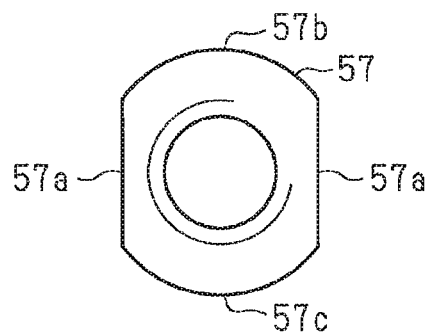
FIG. 5 is a front view of a nut.

As shown in FIG. 5, the nut 57 has a circumferential surface including two straight portions 57a that are flat and extend parallel to each other, an arcuate first curve surface 57b connecting first ends of the two straight portions 57a to each other, and an arcuate second curve surface 57c connecting second ends of the two straight portions 57a to each other.

As shown in FIG. 2, the recess 23c accommodates a valve spring 58. The valve spring 58 is arranged between the nut 57 and the bottom wall of the recess 23c. The valve spring 58 urges the first valve rod 40 and the second valve rod 50 in a direction that separates the first valve member 41 from the first discharge valve seat 25 and the second valve member 51 from the second supply valve seat 22.

The valve body 12 includes a communication flow passage 59 that allows communication between the first discharge port 18 and the second discharge port 19. The communication flow passage 59 includes a first flow passage 59a, a second flow passage 59b, and a third flow passage 59c. The first flow passage 59a is open in a portion of the through hole 14 opposed to the first discharge port 18. The second flow passage 59b is open in a portion of the through hole 14 opposed to the second discharge port 19. The third flow passage 59c connects an end of the first flow passage 59a opposite to the through hole 14 and an end of the second flow passage 59b opposite to the through hole 14. The portion of the through hole 14 located at a side of the first valve chamber 26 opposite to the supply port 15 is in communication with the portion of the through hole 14 located at a side of the second valve chamber 36 opposite to the supply port 15 via the communication flow passage 59. Thus, the same pressure is applied to the portion of the through hole 14 located at the side of the first valve chamber 26 opposite to the supply port 15 and the portion of the through hole 14 located at the side of the second valve chamber 36 opposite to the supply port 15.

As shown in FIG. 1, the magnetic cover 13 includes a base wall 13a and a circumferential wall 13b extending from a peripheral edge of the base wall 13a. The axis of the circumferential wall 13b coincides with the axial center of the through hole 14. The base wall 13a includes a hole 13c. The axial center of the hole 13c coincides with the axis of the circumferential wall 13b.

The magnetic cover 13 embeds a magnetic frame 60 formed from a magnetic material. The magnetic frame 60 includes a flat base portion 60a extending along an inner surface of the base wall 13a of the magnetic cover 13 and a tubular extension 60b extending from a peripheral edge of the base portion 60a along the circumferential wall 13b of the magnetic cover 13. The extension 60b is embedded in the circumferential wall 13b of the magnetic cover 13 so that the magnetic frame 60 is integrated with the magnetic cover 13. A distal portion of the inner circumferential surface of the extension 60b is exposed from an inner circumferential surface of the circumferential wall 13b of the magnetic cover 13. The base portion 60a includes an internally-threaded core hole 60c. The internally-threaded core hole 60c is located at an inner side of the hole 13c. The axial center of the internally-threaded core hole 60c coincides with the axial center of the hole 13c.

The poppet switch valve device 10 includes a solenoid 61. The solenoid 61 includes a coil 62, a fixed core 63, a plunger 64, and a plunger spring 65. The fixed core 63 and the plunger 64 are formed from a magnetic material. The magnetic cover 13 accommodates a tubular bobbin 66 around which the coil 62 is wound. The axis of the bobbin 66 coincides with the axis of the circumferential wall 13b of the magnetic cover 13.

The fixed core 63 is accommodated in the magnetic cover 13. The fixed core 63 includes a shaft 63a and an annular flange 63b projecting from an end of the shaft 63a in a direction orthogonal to the axial direction of the shaft 63a. The shaft 63a is inserted from the base wall 13a of the magnetic cover 13 toward an inner side of the bobbin 66. The shaft 63a is shorter than the bobbin 66 in the axial direction. The shaft 63a includes a flat end surface 63e opposite to the flange 63b. The outer circumferential surface of the flange 63b includes an external core thread 63c engaged with the internally-threaded core hole 60c. The engagement of the external core thread 63c with the internally-threaded core hole 60c couples the fixed core 63 to the base portion 60a of the magnetic frame 60.

The plunger 64 is cylindrical and projects from the inner side of the bobbin 66 in the through hole 14. The plunger 64 is located closer to the valve body 12 than the fixed core 63. The axis of the plunger 64 coincides with the axis of the shaft 63a of the fixed core 63. The plunger 64 includes a flat end surface 64a opposed to the fixed core 63. The end surface 64a of the plunger 64 is configured to be in planar contact with the end surface 63e of the shaft 63a of the fixed core 63. The plunger 64 includes an end surface 64b opposite to the fixed core 63 and configured to contact and separate from the second valve rod 50. An annular flange 64c projects from an end of the outer circumferential surface of the plunger 64 opposite to the fixed core 63. The flange 64c is located at an inner side of the through hole 14.

A tubular magnetic core 67 is located at an inner side of the distal side of the magnetic frame 60. The magnetic core 67 is located closer to the valve body 12 than the bobbin 66 in the axial direction of the plunger 64. The outer circumferential surface of the magnetic core 67 is in contact with a distal portion of the inner circumferential surface of the extension 60b of the magnetic frame 60. The plunger 64 extends through an inner side of the magnetic core 67.

The plunger spring 65 is arranged between the magnetic core 67 and the flange 64c of the plunger 64. One end of the plunger spring 65 is supported by an end surface of the magnetic core 67. The other end of the plunger spring 65 is supported by the flange 64c of the plunger 64. The plunger spring 65 urges the plunger 64 in a direction separating the end surface 64a of the plunger 64 from the end surface 63e of the shaft 63a of the fixed core 63. Urging force of the plunger spring 65 is greater than urging force of the valve spring 58.

Figure 6:
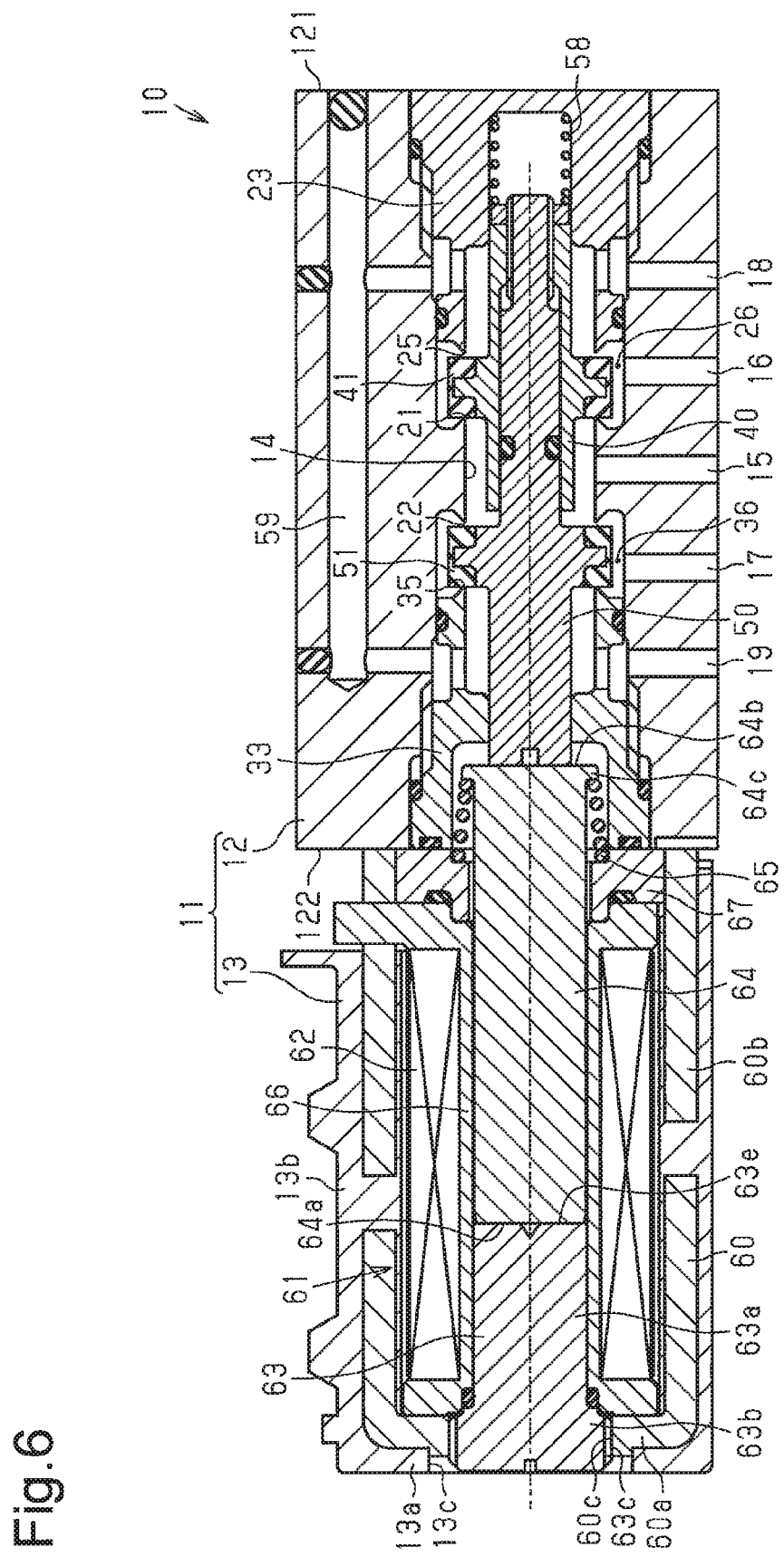
FIG. 6 is a cross-sectional view of the poppet switch valve device shown in FIG. 1 when a coil is energized.

As shown in FIG. 6, when the coil 62 is energized, magnetomotive force of the coil 62 acts in a direction attracting the plunger 64 toward the fixed core 63. The magnetomotive force of the coil 62 acts against the urging force of the plunger spring 65, and the plunger 64 moves in a direction in which the end surface 64a of the plunger 64 approaches the end surface 63e of the shaft 63a of the fixed core 63. Thus, the plunger 64 is moved by excitation of the coil 62.

When the plunger 64 moves in a direction in which the end surface 64a of the plunger 64 approaches the end surface 63e of the shaft 63a of the fixed core 63, the end surface 64a of the plunger 64 is attracted to the end surface 63e of the shaft 63a of the fixed core 63. The end surface 63e of the shaft 63a of the fixed core 63 is an attraction surface that attracts the plunger 64.

Figure 7:
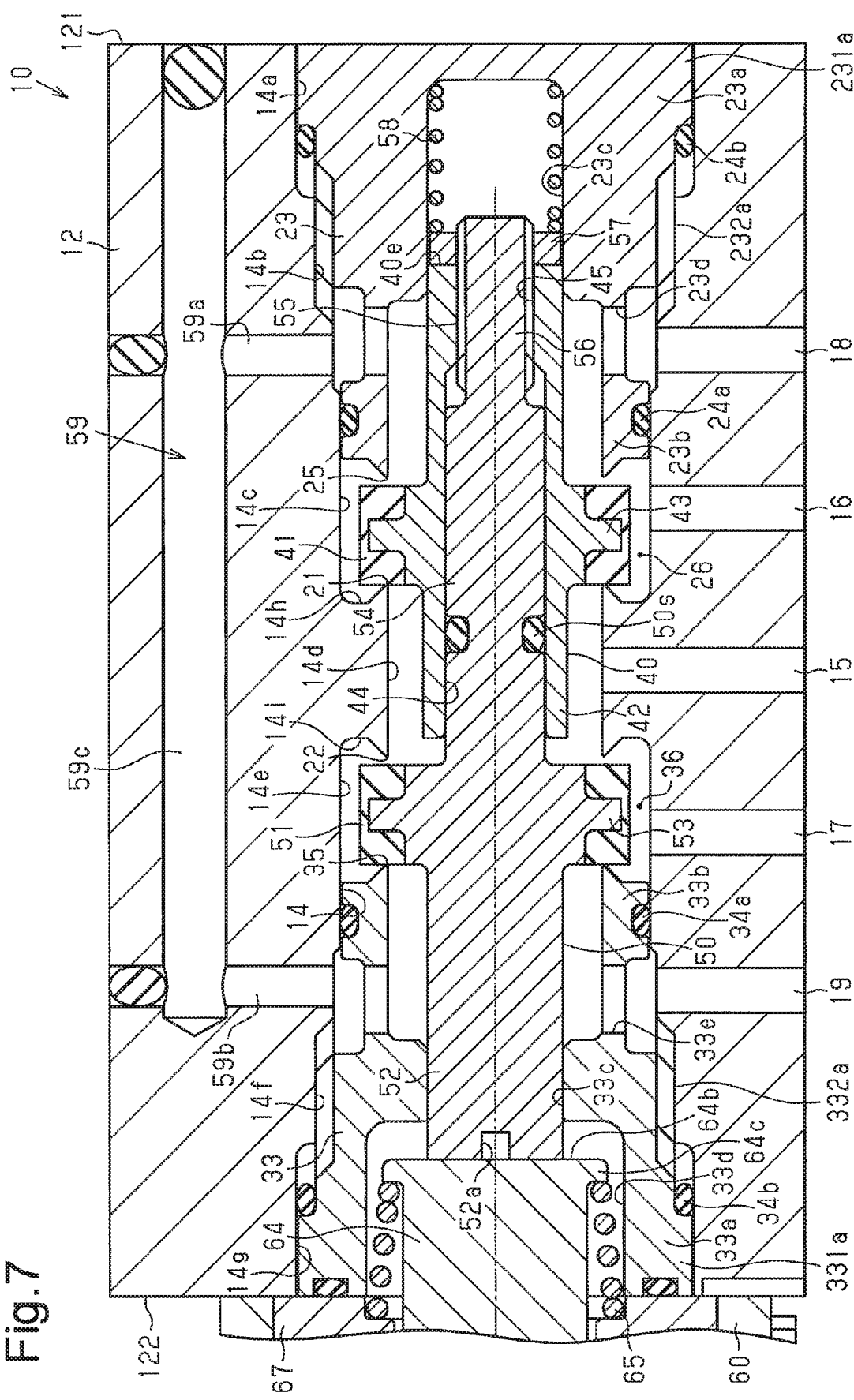
FIG. 7 is a partially enlarged cross-sectional view of the poppet switch valve device shown in FIG. 6.

As described above, the valve spring 58 urges the first valve rod 40 and the second valve rod 50 in a direction that separates the first valve member 41 from the first discharge valve seat 25 and the second valve member 51 from the second supply valve seat 22. As shown in FIG. 7, in accordance with movement of the plunger 64, the first valve rod 40 and the second valve rod 50 move in the direction that separates the first valve member 41 from the first discharge valve seat 25 and the second valve member 51 from the second supply valve seat 22. The first valve member 41 is seated on the first supply valve seat 21, and the second valve member 51 is seated on the second discharge valve seat 35. This interrupts communication between the supply port 15 and the first output port 16 via the small diameter hole 14d and the first valve chamber 26 and allows communication between the first output port 16 and the first discharge port 18 via the first valve chamber 26, the inner side of the extension 23b, and the communication hole 23d. Additionally, communication between the supply port 15 and the second output port 17 via the small diameter hole 14d and the second valve chamber 36 is allowed, and communication between the second output port 17 and the second discharge port 19 via the second valve chamber 36, the inner side of the extension 33b, and the communication hole 33e is interrupted.

At this time, pressure of the fluid supplied from the supply port 15 acts on the first valve member 41 and the second valve member 51 via the small diameter hole 14d. Since the first supply valve seat 21 and the second supply valve seat 22 have the same inner diameter, the pressure reception area of the first valve member 41 in a portion opposed to the first supply valve seat 21 is the same as the pressure reception area of the second valve member 51 in a portion opposed to the second supply valve seat 22. This cancels out the pressure of the fluid applied to the first valve member 41 in the small diameter hole 14d and the pressure of the fluid applied to the second valve member 51 in the small diameter hole 14d. Additionally, since the first discharge valve seat 25 and the second discharge valve seat 35 have the same inner diameter, the pressure reception area of the first valve member 41 in a portion opposed to the first discharge valve seat 25 is the same as the pressure reception area of the second valve member 51 in a portion opposed to the second discharge valve seat 35. The same pressure is applied to a portion of the through hole 14 located at a side of the first valve chamber 26 opposite to the supply port 15 and a portion of the through hole 14 located at a side of the second valve chamber 36 opposite to the supply port 15. This cancels out the pressure of the fluid applied to the first valve member 41 in the inner side of the first discharge valve seat 25 and the pressure of the fluid applied to the second valve member 51 in the inner side of the second discharge valve seat 35. This allows the setting for decreasing the urging force of the valve spring 58, which urges the first valve rod 40 and the second valve rod 50 so that the first valve member 41 is seated on the first supply valve seat 21 and the second valve member 51 is seated on the second discharge valve seat 35.

As shown in FIGS. 1 and 2, when the energization of the coil 62 is stopped, the magnetomotive force of the coil 62 disappears. The plunger 64 is moved by the urging force of the plunger spring 65 in a direction separating the end surface 64a of the plunger 64 from the end surface 63e of the shaft 63a of the fixed core 63 and pushes the first valve rod 40 and the second valve rod 50 countering the urging force of the valve spring 58. The first valve rod 40 and the second valve rod 50 move in a direction that separates the first valve member 41 from the first supply valve seat 21 and the second valve member 51 from the second discharge valve seat 35. The first valve member 41 is seated on the first discharge valve seat 25, and the second valve member 51 is seated on the second supply valve seat 22. This allows communication between the supply port 15 and the first output port 16 via the small diameter hole 14d and the first valve chamber 26 and interrupts communication between the first output port 16 and the first discharge port 18 via the first valve chamber 26, the inner side of the extension 23b, and the communication hole 23d. Additionally, communication between the supply port 15 and the second output port 17 via the small diameter hole 14d and the second valve chamber 36 is interrupted, and communication between the second output port 17 and the second discharge port 19 via the second valve chamber 36, the inner side of the extension 33b, and the communication hole 33e is allowed.

At this time, the pressure of the fluid applied to the first valve member 41 in the small diameter hole 14d and the pressure of the fluid applied to the second valve member 51 in the small diameter hole 14d are cancelled out. Additionally, the pressure of the fluid applied to the first valve member 41 in the inner side of the first discharge valve seat 25 and the pressure of the fluid applied to the second valve member 51 in the inner side of the second discharge valve seat 35 are cancelled out. This allows the setting for decreasing the urging force of the plunger spring 65, which urges the plunger 64 so that the first valve member 41 is seated on the first discharge valve seat 25 and the second valve member 51 is seated on the second supply valve seat 22.

As described above, in the poppet switch valve device 10, the flow passage is switched by the first valve member 41 contacting and separating from the first supply valve seat 21 and the second valve member 51 contacting and separating from the second supply valve seat 22.

The operation of the present embodiment will now be described.

The procedures for assembling the poppet switch valve device 10 will now be described with reference to FIG. 8A. The second valve rod 50 is inserted into the through hole 14 through an opening in the second end surface 122 of the valve body 12 so that the second valve rod 50 is arranged in the through hole 14. The second externally-threaded portion 332a of the second plug 33 is engaged with the second internally-threaded hole 14f to couple the second plug 33 to the valve body 12. At this time, the second valve rod 50 is supported by the guide hole 33c.

A rotation restriction jig 71 is inserted into the rotation restriction recess 52a of the second valve rod 50. The rotation restriction jig 71 includes a main body 71a, a flat insertion portion 71b projecting from the main body 71a, and an urging spring 71c located at a side of the main body 71a opposite to the insertion portion 71b. Urging force of the urging spring 71c is set to be greater than urging force of the valve spring 58. When the insertion portion 71b is inserted in the rotation restriction recess 52a, the rotation restriction jig 71 urges the second valve rod 50 with urging force of the urging spring 71c in a direction in which the second valve member 51 approaches the second supply valve seat 22. When the second valve member 51 is seated on the second supply valve seat 22, rotation of the second valve rod 50 is restricted by the rotation restriction jig 71.

The first valve rod 40 is arranged in the through hole 14 so that the shaft 54 of the second valve rod 50 is inserted through the insertion hole 44 of the first valve rod 40. The internally-threaded hole 45 of the first valve rod 40 is moved forward relative to the external thread 55 of the second valve rod 50 using an adjustment jig 72.

The adjustment jig 72 includes a tubular main body 72a and two flat contact portions 72c projecting from a first end surface 72b of the main body 72a in the axial direction. The main body 72a includes a seal attachment hole 72d, a guide hole 72e, and an insertion hole 72f. The seal attachment hole 72d, the guide hole 72e, and the insertion hole 72f are sequentially arranged in the main body 72a from the first end surface 72b of the main body 72a to a second end surface 72g of the main body 72a in the axial direction. The seal attachment hole 72d, the guide hole 72e, and the insertion hole 72f are circular.

The seal attachment hole 72d is open in the first end surface 72b of the main body 72a. The insertion hole 72f is open in the second end surface 72g of the main body 72a. One end of the guide hole 72e is in communication with the seal attachment hole 72d. The other end of the guide hole 72e is in communication with the insertion hole 72f. The seal attachment hole 72d has a larger diameter than the guide hole 72e and the insertion hole 72f. The diameter of the guide hole 72e is smaller than the diameter of the insertion hole 72f. The diameter of the guide hole 72e is slightly larger than the outer diameter of the shaft 42. More specifically, the diameter of the guide hole 72e is the same as the diameter of the recess 23c of the first plug 23. When the internally-threaded hole 45 moves forward and backward relative to the external thread 55 so that the first valve rod 40 moves relative to the second valve rod 50 in the axial direction, the wall surface of the guide hole 72e serves as a guide surface that slides on the outer circumferential surface of the shaft 42 and guides the movement of the first valve rod 40 relative to the second valve rod 50 in the axial direction.

An annular seal member 72h is attached to the wall surface of the seal attachment hole 72d. The seal member 72h is arranged between the outer circumferential surface of the shaft 42 and the wall surface of the seal attachment hole 72d. Additionally, an annular seal member 72i is attached to the outer circumferential surface of the main body 72a. The seal member 72i is arranged between the outer circumferential surface of the main body 72a and the wall surface of the through hole 14.

As shown in FIG. 8B, each of the two contact portions 72c includes a flat contact surface 72k. The two contact surfaces 72k extend parallel to each other and opposed to each other in a direction orthogonal to the axial direction of the main body 72a.

Figures 9A, 9B:
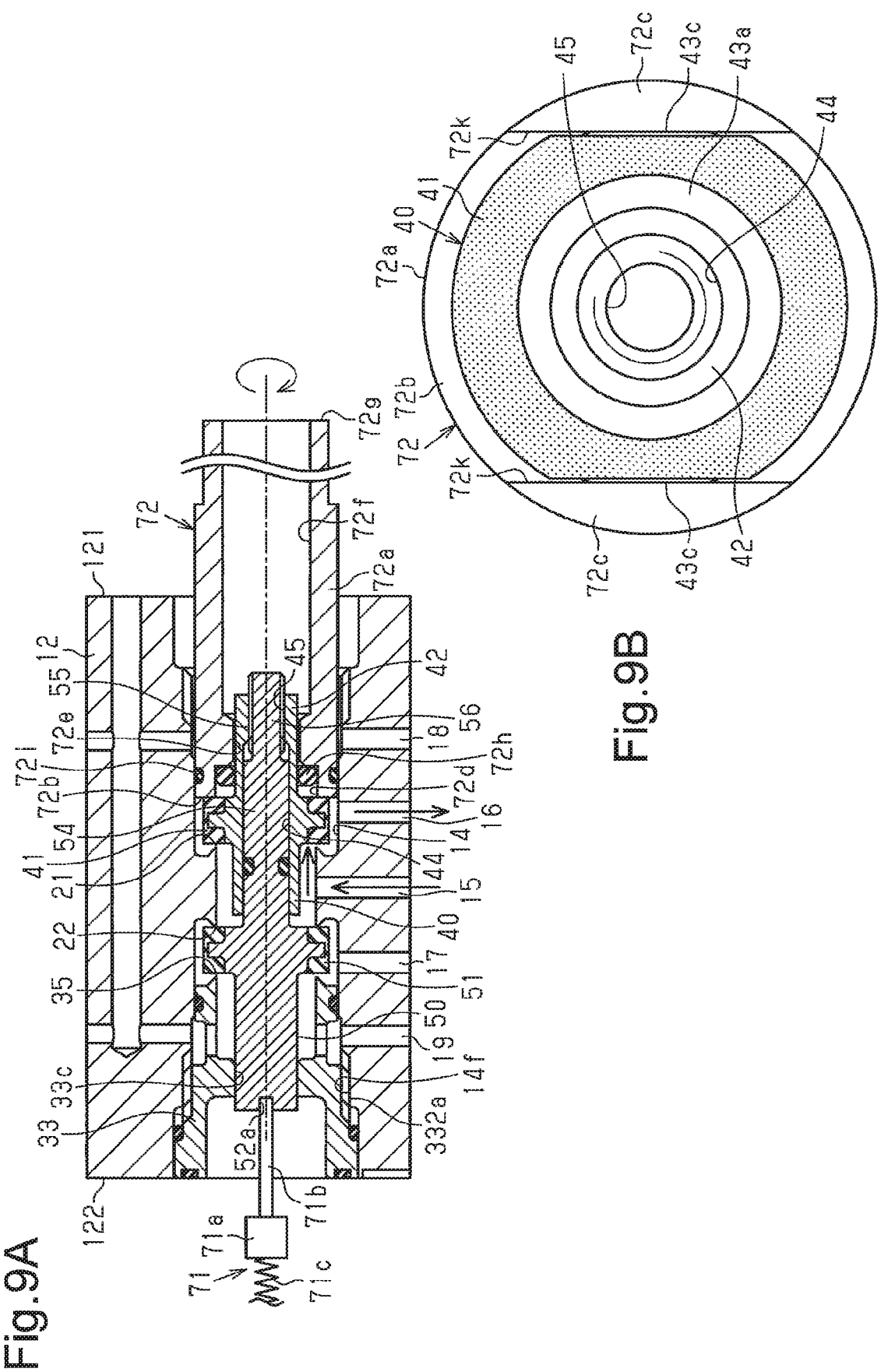
FIG. 9A is a cross-sectional view showing a state in which strokes of the first valve member and a second valve member are adjusted.
FIG. 9B is a front view showing the relationship between the first valve member and the first jig.

As shown in FIGS. 9A and 9B, the width between the contact surfaces 72k of the two contact portions 72c is slightly greater than the width between the two planar portions 43c of the large diameter portion 43 of the first valve rod 40. The contact surfaces 72k of the two contact portions 72c are respectively in planar contact with the two planar portions 43c of the large diameter portion 43 of the first valve rod 40.

When the contact surfaces 72k of the two contact portions 72c are in planar contact with the two planar portions 43c and the adjustment jig 72 is rotated, the first valve rod 40 rotates together with the adjustment jig 72. At this time, rotation of the second valve rod 50 is restricted by the rotation restriction jig 71. This allows the internally-threaded hole 45 to move forward and backward relative to the external thread 55. The planar portions 43c are engagement portions that engage with the adjustment jig 72 when the first valve rod 40 moves relative to the second valve rod 50 in the axial direction. More specifically, the adjustment jig 72 is a jig for rotating the first valve rod 40 when the internally-threaded hole 45 moves forward and backward relative to the external thread 55 so that the first valve rod 40 moves relative to the second valve rod 50 in the axial direction. Thus, the first valve rod 40 includes the engagement portions.

When the adjustment jig 72 is rotated in a forward direction, the first valve rod 40 rotates together with the adjustment jig 72 in the forward direction, and the internally-threaded hole 45 moves forward relative to the external thread 55. The adjustment jig 72 is rotated until the internally-threaded hole 45 moves forward relative to the external thread 55 and the first valve member 41 comes into contact with the first supply valve seat 21.

When the first valve member 41 is seated on the first supply valve seat 21, the fluid is supplied from the supply port 15. When the fluid is supplied from the supply port 15, the adjustment jig 72 is rotated in a reverse direction. The first valve rod 40 rotates together with the adjustment jig 72 in the reverse direction, and the internally-threaded hole 45 moves backward relative to the external thread 55. This moves the first valve rod 40 relative to the second valve rod 50 and gradually separates the first valve member 41 away from the first supply valve seat 21.

As the first valve member 41 separates away from the first supply valve seat 21, the flow rate of the fluid discharged from the supply port 15 to the first output port 16 via the small diameter hole 14d and the first valve chamber 26 increases. The flow rate of the fluid discharged to the first output port 16 is detected, for example, by a flow rate sensor (not shown) that detects a flow rate of fluid discharged to the first output port 16. When the flow rate of the fluid discharged to the first output port 16 reaches a predetermined flow rate, the rotation of the adjustment jig 72 is stopped. Consequently, the stroke of the first valve member 41 is adjusted to a predetermined stroke.

Figure 10A:
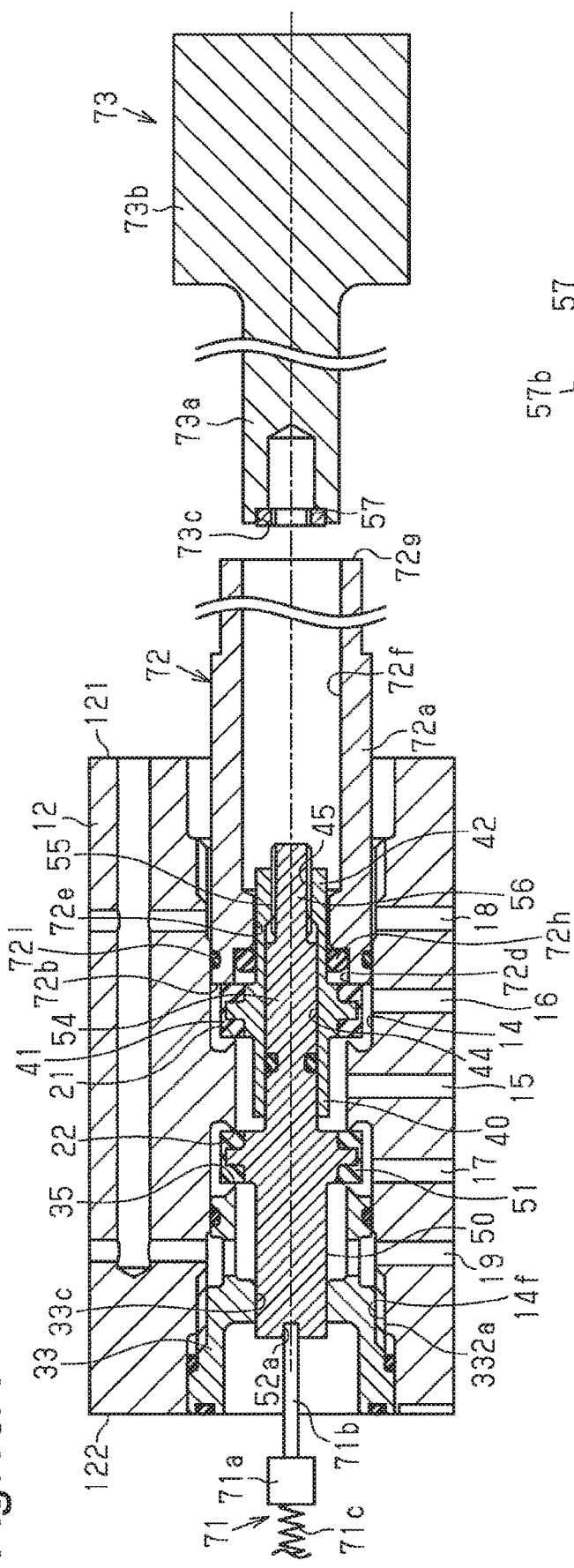
FIG. 10A is an exploded cross-sectional view showing a state in which a nut engages with an external thread using a second jig.
Figure 10B:
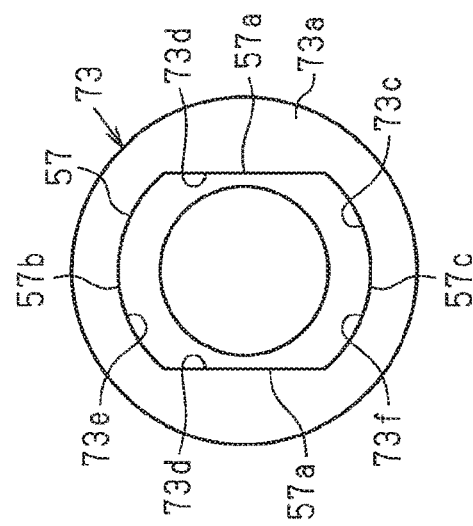
FIG. 10B is a front view showing the relationship between the nut and the second jig.

As shown in FIGS. 10A and 10B, the nut 57 is engaged with the external thread 55 using a fastening jig 73. The fastening jig 73 includes a cylindrical insertion portion 73a, which is inserted into the insertion hole 72f of the adjustment jig 72, and an operating portion 73b, which is continuous with the insertion portion 73a for rotating the fastening jig 73. The insertion portion 73a is set to be longer than or equal to the insertion hole 72f in the axial direction. The outer diameter of the insertion portion 73a is the same as the diameter of the insertion hole 72f.

The insertion portion 73a includes an accommodation recess 73c accommodating the nut 57 in an end surface opposite to the operating portion 73b. As shown in FIG. 10B, the wall surface of the accommodation recess 73c includes two contact surfaces 73d extending along the two straight portions 57a of the nut 57, a first curved surface 73e extending along the first curve surface 57b of the nut 57, and a second curved surface 73f extending along the second curve surface 57c of the nut 57. The two contact surfaces 73d are respectively in planar contact with the two straight portions 57a. The first curved surface 73e is in planar contact with the first curve surface 57b. The second curved surface 73f is in planar contact with the second curve surface 57c. When the operating portion 73b is rotated and the fastening jig 73 is rotated, the nut 57 is configured to rotate together with the fastening jig 73 while rotation of the nut 57 relative to the fastening jig 73 is restricted.

Figure 11:
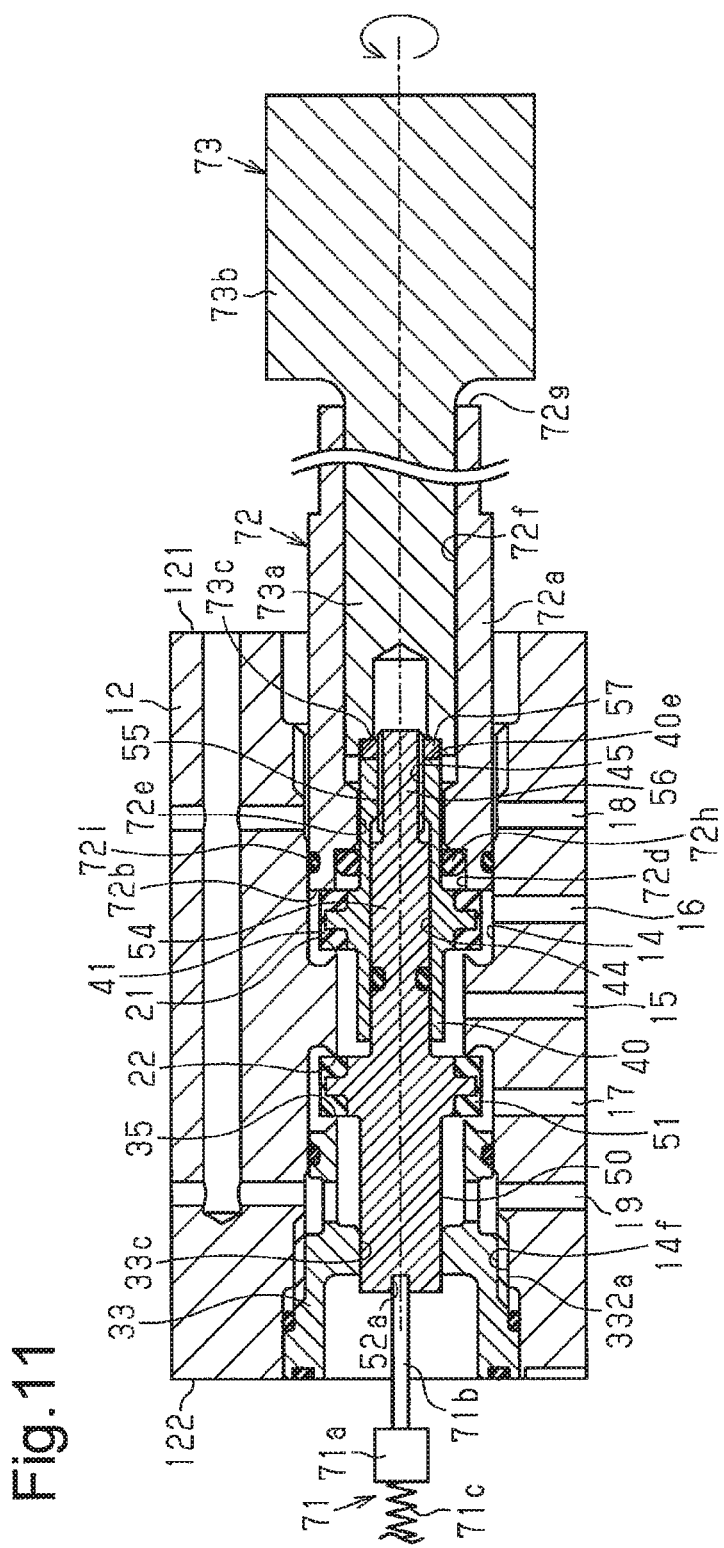
FIG. 11 is a cross-sectional view showing a state in which the nut is engaged with the external thread.

As shown in FIG. 11, when the insertion portion 73a is inserted into the insertion hole 72f and the fastening jig 73 is rotated, the nut 57 moves forward relative to the external thread 55 and comes into contact with the end surface 40e of the first valve rod 40. At this time, the contact surfaces 72k of the two contact portions 72c of the adjustment jig 72 are respectively in planar contact with the two planar portions 43c. Thus, rotation of the first valve rod 40 is restricted by the adjustment jig 72. When the nut 57 engages with the external thread 55, the two planar portions 43c serve as rotation stoppers that engage with the adjustment jig 72 and restrict rotation of the first valve rod 40. Thus, the first valve rod 40 includes the rotation stoppers.

The contact of the nut 57 with the end surface 40e of the first valve rod 40 couples the first valve rod 40 to the second valve rod 50 and restricts movement of the first valve rod 40 relative to the second valve rod 50 in the axial direction. The poppet switch valve device 10 includes the nut 57, that is, a restriction portion that restricts movement of the first valve rod 40 relative to the second valve rod 50 in the axial direction after the first valve rod 40 is moved relative to the second valve rod 50 in the axial direction using the adjustment jig 72.

When the stroke of the first valve member 41 is adjusted to the predetermined stroke, the first valve rod 40 is coupled to the second valve rod 50. The insertion portion 73a is removed from the insertion hole 72f, and the adjustment jig 72 is removed from the through hole 14. When the valve spring 58 is accommodated in the recess 23c, the first externally-threaded portion 232a of the first plug 23 is engaged with the first internally-threaded hole 14b. At this time, the first externally-threaded portion 232a is moved forward relative to the first internally-threaded hole 14b until the first discharge valve seat 25 comes into contact with the first valve member 41.

Subsequently, the insertion portion 71b of the rotation restriction jig 71 is removed from the rotation restriction recess 52a. The urging force of the valve spring 58 moves the first valve rod 40 and the second valve rod 50 in a direction that separates the first valve member 41 from the first discharge valve seat 25 and the second valve member 51 from the second supply valve seat 22. The first valve rod 40 and the second valve rod 50 are moved until the flow rate of the fluid discharged to the first output port 16 becomes zero, that is, the first valve member 41 is seated on the first supply valve seat 21. Then, the position of the second plug 33 is finely adjusted so that the second discharge valve seat 35 comes into contact with the second valve member 51.

Consequently, the stroke of the second valve member 51 is adjusted to the predetermined stroke.

The embodiment has the advantages described below.

(1) The first valve rod 40 includes the two planar portions 43c that engage with the adjustment jig 72 when the internally-threaded hole 45 is moved forward and backward relative to the external thread 55 so that the first valve rod 40 moves relative to the second valve rod 50 in the axial direction. After the first valve rod 40 is moved relative to the second valve rod 50 in the axial direction using the adjustment jig 72 to adjust the strokes of the first valve member 41 and the second valve member 51 to the predetermined strokes, the nut 57 restricts movement of the first valve rod 40 relative to the second valve rod 50 in the axial direction. In the poppet switch valve device 10, for example, the first supply valve seat 21 or the second supply valve seat 22 may have a dimensional tolerance in the axial direction of the valve body 12, and the first valve rod 40 or the second valve rod 50 may have a dimensional tolerance in the axial direction. Even when such dimensional tolerances are added, the strokes of the first valve member 41 and the second valve member 51 are adjustable to the predetermined strokes. This avoids a situation in which the tolerances of strokes of the first valve member 41 and the second valve member 51 are increased by the addition of dimensional tolerances. Accordingly, variations in the flow rate of the fluid are limited, and power supplied to the coil 62 to move the plunger 64 is reduced.

(2) The nut 57, which is the fastening member, serves as the restriction portion that restricts movement of the first valve rod 40 relative to the second valve rod 50 in the axial direction after the first valve rod 40 is moved relative to the second valve rod 50 in the axial direction using the adjustment jig 72. This facilitates the coupling of the first valve rod 40 and the second valve rod 50 as compared to, for example, a case in which the restriction portion is an adhesive that adheres the second valve rod 50 to the wall surface of the insertion hole 44 of the first valve rod 40. Additionally, the seal portion 50s is arranged between the second valve rod 50 and the wall surface of the insertion hole 44 to limit leakage of the fluid from a gap between the second valve rod 50 and the wall surface of the insertion hole 44. Further, the first valve rod 40 includes the two planar portions 43c serving as rotation stoppers that engage with the adjustment jig 72 and restrict rotation of the first valve rod 40 when the nut 57 engages with the external thread 55. Thus, when the nut 57 engages with the external thread 55, rotation of the first valve rod 40 together with the nut 57 is avoided.

(3) The two planar portions 43c serve as engagement portions that engage with the adjustment jig 72 when the internally-threaded hole 45 are moved forward and backward relative to the external thread 55 so that the first valve rod 40 moves relative to the second valve rod 50 in the axial direction. When the nut 57 engages with the external thread 55, the two planar portions 43c serve as rotation stoppers that engage the adjustment jig 72 and restrict rotation of the first valve rod 40. That is, the two planar portions 43c are the engagement portions and the rotation stopper. This simplifies the configuration of the first valve rod 40 as compared to a case in which the first valve rod 40 separately includes an engagement portion and a rotation stopper.

(4) The two planar portions 43c exposed from the first valve member 41 are engagement portions that engage with the adjustment jig 72. This stabilizes the engagement state of the engagement portions with the adjustment jig 72 as compared to, for example, a case in which the first valve member 41 formed from an elastically deformable rubber includes an engagement portion configured to engage with the adjustment jig 72 and the engagement portion is engaged the adjustment jig 72.

(5) The contact of the nut 57 with the end surface 40e of the first valve rod 40 generates reaction forces between the end surface 40e of the first valve rod 40 and the nut 57 acting in directions separating from each other. As a result, the thread ridge of the external thread 55 and the thread ridge of the internally-threaded hole 45 are forced against each other in the axial direction of the first valve rod 40 and the second valve rod 50. Also, the thread ridge of the nut 57 and the thread ridge of the external thread 55 are forced against each other in the axial direction of the first valve rod 40 and the second valve rod 50. This generates fastening force between the first valve rod 40 and the second valve rod 50 via the nut 57 and couples the first valve rod 40 and the second valve rod 50 to each other. In this configuration, the first valve rod 40 and the second valve rod 50 are coupled without a backlash between the external thread 55 and the wall surface of the internally-threaded hole 45 in a direction in which the first valve rod 40 and the second valve rod 50 move. This strengthens the coupling of the first valve rod 40 and the second valve rod 50.

(6) The strokes of the first valve member 41 and the second valve member 51 are adjusted to the predetermined strokes. This, for example, eliminates the need for a strict control of dimensional tolerances of the first supply valve seat 21 and the second supply valve seat 22 in the axial direction of the valve body 12 and dimensional tolerances of the first valve rod 40 and the second valve rod 50 in the axial direction. Thus, the manufacturing cost is reduced.

(7) The adjustment of strokes of the first valve member 41 and the second valve member 51 adjusts the flow rate of the fluid. This eliminates the need for separately manufacturing the poppet switch valve devices 10 that have different flow rates of fluid. Thus, the manufacturing cost is reduced.

It should be apparent to those skilled in the art that the present invention may be embodied in many other specific forms without technically contradicting each other or departing from the spirit or scope of the invention. Particularly, it should be understood that the present invention may be embodied in the following forms.

Figure 12:
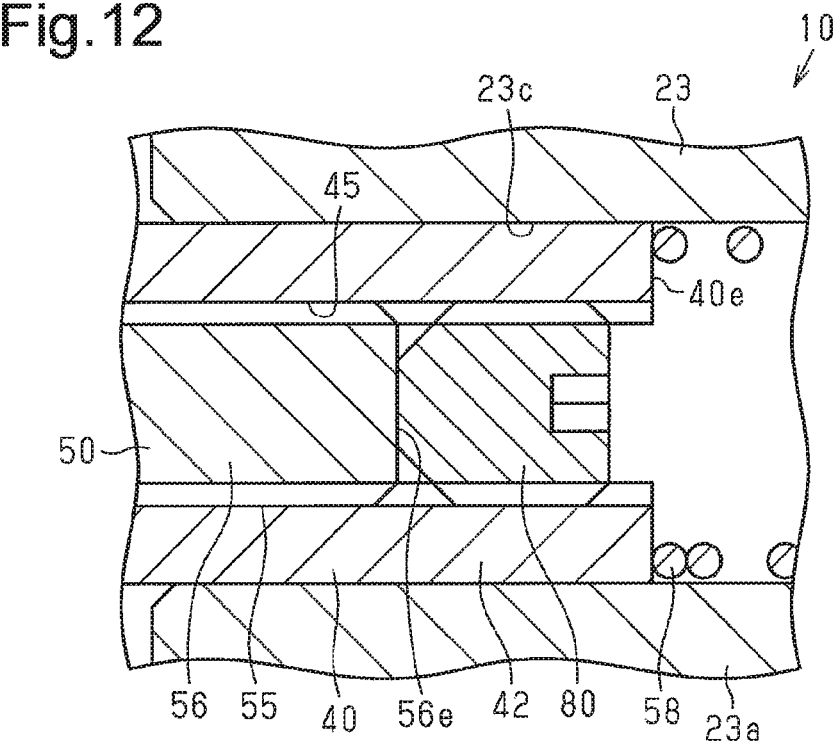
FIG. 12 is a cross-sectional view showing a coupling state of the first valve rod and the second valve rod in another embodiment.
Figure 13:
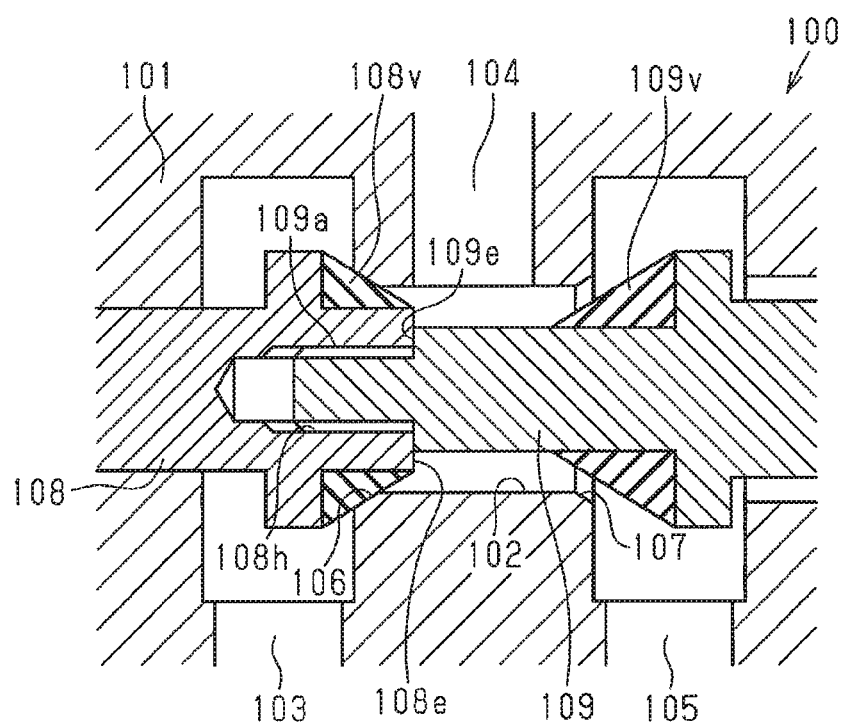
FIG. 13 is a partially enlarged cross-sectional view of a prior art example of a poppet switch valve device.

As shown in FIG. 12, the restriction portion may be a setscrew 80, which is a fastening member that engages with the internally-threaded hole 45 in contact with a distal surface 56e of the insertion portion 56, that is, the end surface of the second valve rod 50. In this case, the end surface 40e of the first valve rod 40 projects beyond the distal surface 56e of the insertion portion 56. When the setscrew 80 is engaged with the internally-threaded hole 45, the two planar portions 43c engage with the adjustment jig 72 and restrict rotation of the first valve rod 40.

When the stroke of the first valve member 41 is adjusted, the first valve member 41 is seated on the first supply valve seat 21, the fluid is supplied from the supply port 15, and the adjustment jig 72 is rotated in the reverse direction so that the first valve member 41 gradually separates away from the first supply valve seat 21. Instead, for example, when the stroke of the first valve member 41 is adjusted, the first valve member 41 may be separated from the first supply valve seat 21, the fluid may be supplied from the supply port 15, and the adjustment jig 72 may be rotated in the forward direction so that the first valve member 41 gradually approaches the first supply valve seat 21. As the first valve member 41 approaches the first supply valve seat 21, the flow rate of the fluid discharged from the supply port 15 to the first output port 16 through the small diameter hole 14d and the first valve chamber 26 decreases. When the flow rate of the fluid discharged to the first output port 16 reaches a predetermined flow rate, rotation of the adjustment jig 72 is stopped. As a result, the stroke of the first valve member 41 is adjusted to the predetermined stroke.

The first valve member 41 and the second valve member 51 may not need to be circular.

The restriction portion is not limited to the nut 57. The restriction portion may be, for example, an adhesive that adheres the wall surface of the insertion hole 44 of the first valve rod 40 to the second valve rod 50. In this case, the adhesive also serves as a seal portion arranged between the second valve rod 50 and the wall surface of the insertion hole 44. This eliminates the need for arranging the seal portion 50s between the second valve rod 50 and the wall surface of the insertion hole 44 and reduces the number of components.

The two planar portions 43c may not need to be a rotation stopper that engages with the adjustment jig 72 and restricts rotation of the first valve rod 40, for example, when the nut 57 engages with the external thread 55. The first valve rod 40 may separately include an engagement portion and a rotation stopper.

For example, the first valve member 41 may include an engagement portion configured to engage with the adjustment jig 72, and the engagement portion may engage with the adjustment jig 72.

The first valve rod 40 may include recesses or projections as engagement portions. The recesses or projections of the first valve rod 40 may be fitted to projections or recesses of the adjustment jig 72 so that the first valve rod 40 engages with the adjustment jig 72. Further, the recesses or projections of the first valve rod 40 may be rotation stoppers. The configurations of the engagement portions and the rotation stoppers may be changed.

The rotation restriction recess 52a may be polygonal. In this case, the insertion portion 71b of the rotation restriction jig 71, which is inserted into the rotation restriction recess 52a, may have the form of a polygonal rod.

The inner diameter of the first supply valve seat 21 may differ from the inner diameter of the second supply valve seat 22.

The inner diameter of the first discharge valve seat 25 may differ from the inner diameter of the second discharge valve seat 35.

The valve body 12 may not need to include the communication flow passage 59. The same pressure may not need to be applied to a portion of the through hole 14 located at a side of the first valve chamber 26 opposite to the supply port 15 and a portion of the through hole 14 located at a side of the second valve chamber 36 opposite to the supply port 15.

The first discharge port 18 may be in communication with the second discharge port 19 via a passage formed in the valve body 12. In this case, the end of one of the first discharge port 18 and the second discharge port 19 opposite to the through hole 14 may not need to be open in the outer surface of the valve body 12.

The poppet switch valve device 10 may be, for example, a three-port switch valve in which the valve body 12 includes a supply port, an output port, and a discharge port.

What is claimed is:

1. A poppet switch valve device, comprising:
    a tubular valve body, through which a through hole extends in an axial direction of the valve body, the valve body including a first valve seat and a second valve seat facing opposite sides in the axial direction of the valve body;
    a first valve rod including a first valve member configured to contact and separate from the first valve seat;
    a second valve rod including a second valve member configured to contact and separate from the second valve seat; and
    a solenoid including a coil and a plunger configured to be moved by excitation of the coil, wherein
    the first valve rod and the second valve rod are coaxially coupled to each other and configured to integrally move within the through hole in the axial direction of the valve body in accordance with movement of the plunger,
    the poppet switch valve device is configured to switch a flow passage when the first valve member contacts and separates from the first valve seat and the second valve member contacts and separates from the second valve seat,
    the first valve rod includes an insertion hole extending through in an axial direction of the first valve rod,
    the second valve rod includes an insertion portion inserted into the insertion hole,
    the insertion portion includes an outer circumferential surface including an external thread,
    the insertion hole includes an internally-threaded hole engaged with the external thread,
    the first valve rod includes an engagement portion configured to engage with a jig,
    when the jig engages with the engagement portion and rotates the first valve rod so that the internally-threaded hole moves forward and backward relative to the external thread, the first valve rod is moved relative to the second valve rod in the axial direction,
    the poppet switch valve device further comprises a restriction portion, and
    the restriction portion is configured to restrict movement of the first valve rod relative to the second valve rod in the axial direction after the first valve rod is moved relative to the second valve rod in the axial direction using the jig.

2. The poppet switch valve device according to claim 1, wherein
    the restriction portion includes one of a fastening member that engages with the external thread in contact with an end surface of the first valve rod and a fastening member that engages with the internally-threaded hole in contact with an end surface of the second valve rod,
    a seal portion is arranged between the second valve rod and a wall surface of the insertion hole, and
    the first valve rod includes a rotation stopper configured to engage with the jig and restrict rotation of the first valve rod when the fastening member engages with one of the external thread and the internally-threaded hole.

3. The poppet switch valve device according to claim 2, wherein the engagement portion includes the rotation stopper.

4. The poppet switch valve device according to claim 1, wherein
    the first valve rod includes two planar portions exposed from the first valve member, and
    the engagement portion includes the two planar portions.

* * * * *